(12) United States Patent
DeCosta

(10) Patent No.: US 9,611,879 B2
(45) Date of Patent: Apr. 4, 2017

(54) RAPID MOUNT WALL ANCHORING SYSTEM WITH CABLE PASS THROUGH

(71) Applicant: Thomas DeCosta, Westport, MA (US)

(72) Inventor: Thomas DeCosta, Westport, MA (US)

(*) Notice: Subject to any disclaimer, the term of this patent is extended or adjusted under 35 U.S.C. 154(b) by 0 days.

(21) Appl. No.: 14/120,287

(22) Filed: May 14, 2014

(65) Prior Publication Data
US 2014/0341673 A1  Nov. 20, 2014

Related U.S. Application Data

(60) Provisional application No. 61/855,370, filed on May 14, 2013, provisional application No. 61/956,528, filed on Jun. 10, 2013, provisional application No. 61/960,817, filed on Sep. 28, 2013, provisional application No. 61/962,115, filed on Oct. 31, 2013.

(51) Int. Cl.
F16B 13/04 (2006.01)
F16B 13/08 (2006.01)

(52) U.S. Cl.
CPC ...... *F16B 13/0808* (2013.01); *F16B 13/0833* (2013.01)

(58) Field of Classification Search
CPC .. F16B 13/0808; F16B 13/0833; F16B 13/04; F16B 13/045; F16B 13/08; F16B 13/0825; F16B 13/0866; F16B 2013/10; F16B 2013/105; H02G 3/123; H02G 3/22; H02G 3/083
USPC ... 174/58, 480, 481, 60, 503, 502, 135, 535, 174/659, 67; 248/27.1, 906, 56, 231.91; 52/220.8; 411/80.1
See application file for complete search history.

(56) References Cited

U.S. PATENT DOCUMENTS

| | | | | |
|---|---|---|---|---|
| 3,385,156 A * | 5/1968 | Polos | ..................... | F16B 13/002 411/30 |
| 4,134,636 A * | 1/1979 | Kleinatland | ........... | H02G 3/123 174/58 |
| 4,408,696 A * | 10/1983 | Crosson | ................. | H02G 3/123 174/58 |
| 4,479,317 A * | 10/1984 | Hanna | ...................... | H01H 9/18 174/66 |
| 4,642,009 A * | 2/1987 | Fischer | ................. | F16B 13/061 411/38 |
| 5,690,454 A * | 11/1997 | Smith | ................... | F16B 13/002 411/30 |
| 5,944,466 A * | 8/1999 | Rudnicki et al. | ............. | 411/344 |
| 6,102,360 A * | 8/2000 | Clegg et al. | ................. | 248/27.1 |
| 6,346,674 B1 * | 2/2002 | Gretz | .............................. | 174/58 |
| 6,746,191 B2 * | 6/2004 | Edland | ................ | F16B 13/0808 411/34 |
| 7,078,618 B2 * | 7/2006 | Dinh | ............................. | 174/481 |
| 7,300,025 B2 * | 11/2007 | Korcz | .............................. | 248/56 |

(Continued)

*Primary Examiner* — Ingrid M Weinhold

(57) ABSTRACT

A rapid mount wall anchoring system and cable pass through for securing devices to a wall and routing device cables through a wall. The wall anchoring system includes a rigid frame with mounting fasteners for securing the frame to a wall. The frame includes a load bearing plate having a bore in alignment with a second bore located rearward of the load bearing plate. The plate further includes an opening for the passage of low voltage cables to the mounted device. A second mounting fastener for securing a device to the plate engages both first and second rigid frame bores to provide increased load capacity.

6 Claims, 7 Drawing Sheets

(56) References Cited

U.S. PATENT DOCUMENTS

| | | | |
|---|---|---|---|
| 7,759,576 B1 | 7/2010 | Gretz | |
| D627,305 S | 11/2010 | Gretz | |
| 7,897,870 B1 * | 3/2011 | Gretz | 174/58 |
| 8,044,300 B1 * | 10/2011 | Gretz | 174/58 |
| 8,063,302 B1 * | 11/2011 | Gretz | 174/58 |
| 8,076,575 B1 * | 12/2011 | Gretz | 174/50 |
| 8,124,873 B1 | 2/2012 | Gretz | |
| 8,148,634 B1 * | 4/2012 | Gretz | 174/50 |
| 8,148,635 B1 * | 4/2012 | Gretz | 174/50 |
| 8,314,350 B1 | 11/2012 | Gretz | |
| 8,324,516 B1 | 12/2012 | Gretz | |
| 8,357,853 B1 | 1/2013 | Gretz | |
| 8,445,779 B1 * | 5/2013 | Gretz | 174/53 |
| 2003/0209358 A1 * | 11/2003 | Kruse | H02G 3/22 174/58 |
| 2006/0207792 A1 * | 9/2006 | Sakurai | 174/267 |
| 2012/0051868 A1 * | 3/2012 | Stimpson | 411/33 |
| 2012/0291220 A1 * | 11/2012 | Okuhara et al. | 16/2.2 |

* cited by examiner

RAPID MOUNT WALL ANCHORING SYSTEM WITH CABLE PASS THROUGH

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s) (the "Related Applications") to the extent such subject matter is not inconsistent herewith; the present application also claims the earliest available effective filing date(s) from, and also incorporates by reference in its entirety all subject matter of any and all parent, grandparent, great-grandparent, etc. applications of the Related Application(s) to the extent such subject matter is not inconsistent herewith:

U.S. provisional patent application 61/855,370 entitled "Grommet Assembly for Wall Panels", naming Thomas DeCosta as inventor, filed May 14, 2013, U.S. provisional patent application 61/956,528 entitled "Grommet Assembly for Wall Panels", naming Thomas DeCosta as inventor, filed Jun. 10, 2013, U.S. provisional patent application 61/960817 entitled "Grommet Assembly for Wall Panels", naming Thomas DeCosta as inventor, filed Sep. 28, 2013, U.S. provisional patent application 61/962,115 entitled "Grommet Assembly for Wall Panels", naming Thomas DeCosta as inventor, filed Oct. 31, 2013.

BACKGROUND

1. Field of Use

The invention generally relates to the mounting of electrical devices on walls and in buildings and specifically to a rapid mount anchoring system for the mounting and securement of devices thereon, the anchoring system hardware hidden behind the wall providing an aesthetically pleasing appearance at the wall area.

2. Description of Prior Art

Grommets have been used in interior space divider panel systems and standard walls for granting access through a wall to provide computer cables, data connection modules, electrical wires, plug outlets, jacks, and the like, to workstations or other locations/equipments.

For example, in numerous office environments, a multi-wall arrangement divides a space into individual, personal workstations that often require numerous electrical conduits, receptacles, computer connectors and telephone lines to be within easy reach at each of often differently configured work areas.

Grommet assemblies for the routing of cables are known in the art. For example, U.S. Pat. No. 8,357,853 is a rapid mount electrical cable entry device with a flexible slotted insert for routing low voltage cables through walls. The cable entry device includes a rigid low voltage frame with a plate having an opening therein, a rearward extending sidewall surrounding the opening, and a flexible insert within the opening. The flexible insert is removable to provide access to mounting fasteners on the inner periphery of the plate opening. All that is required for preparing the wall for installation of the cable entry device is a simple circular hole, which can be rapidly made in the sheet rock by a simple hole saw.

It would greatly improve these wall systems to allow for the rapid mounting of an electrical device (Speakers, cameras, televisions) to the structure without requiring a second mounting device.

A field installed rapid mount wall anchoring system usable in horizontal ceilings and vertical walls for the mounting of structures, including electrical devices, having the capability to support the weight of such structures, and allow cable pass through and strain relief protection would be desirable.

SUMMARY OF THE INVENTION

The invention is a rapid mount wall anchoring system and cable pass through for securing devices to a wall and routing device cables through the wall. The wall anchoring system includes a rigid frame with a lip having an opening therein, a rearward extending sidewall surrounding the opening, rearwardly extending guide members extending rearward from said sidewalls, and a rigid mounting plate within the opening. The rigid mounting plate is snap fit into the opening and includes a center positioned threaded bore.

The rigid mounting plate is removable to provide access to mounting fasteners integral to the guide members and positioned on the inner periphery of the plate opening. All that is required for preparing the wall for installation of the wall anchoring system is a simple circular hole, which can be rapidly made in the sheet rock by a simple hole saw. To secure the rigid frame to the wall, the mounting fasteners with attached clamp arms on the frame, and the guide members are passed through the hole in the wall and the clamp arms are rotated to draw the clamp arms toward the mounting plate.

After the frame is secured to the wall, the rigid plate insert is reinserted within the plate opening and thus provides a load bearing support for devices mounted on the plate. A cable pass through hole allows for the passage of cables from the mounted device through the wall. The center positioned threaded bore of the rigid plate is in alignment with a second threaded bore further rearward of the plate. The second threaded bore is formed within a cross member that rigidly connects the guide members at their distal ends. The first and second threaded bores accept a fastening screw for securement of a device to the plate, and allows for the load of the attached device to be distributed throughout the rapid mount anchoring system.

Several advantages are achieved with the rapid mount wall anchoring system of the present invention, including: (1) The wall anchoring system provides a support base for mounting electrical devices and structures to a wall (2) The wall anchoring system can be secured to a wall in less than a minute as wall preparation requires only a standard size hole saw. (3) The wall anchoring system can accommodate ¼-inch to 1.5-inch wall thicknesses (4) The wall anchoring system can safely secure weights of up to 90 lbs (8) The cable entry device can be used to provide an aesthetically pleasing cable entry port on any wall.

These and other objects and advantages of the present invention will be better understood by reading the following description along with reference to the drawings.

BRIEF DESCRIPTION OF THE DRAWINGS

The foregoing and other objects, features, and advantages of the invention are apparent from the following detailed description taken in conjunction with the accompanying drawings in which.

DETAILED DESCRIPTION

In the following description, the same numerical references refer to similar elements. The embodiments, geometrical configurations, materials mentioned and/or dimensions shown in the figures or described in the present description are preferred embodiments only, given for exemplification purposes only.

Figure 4:
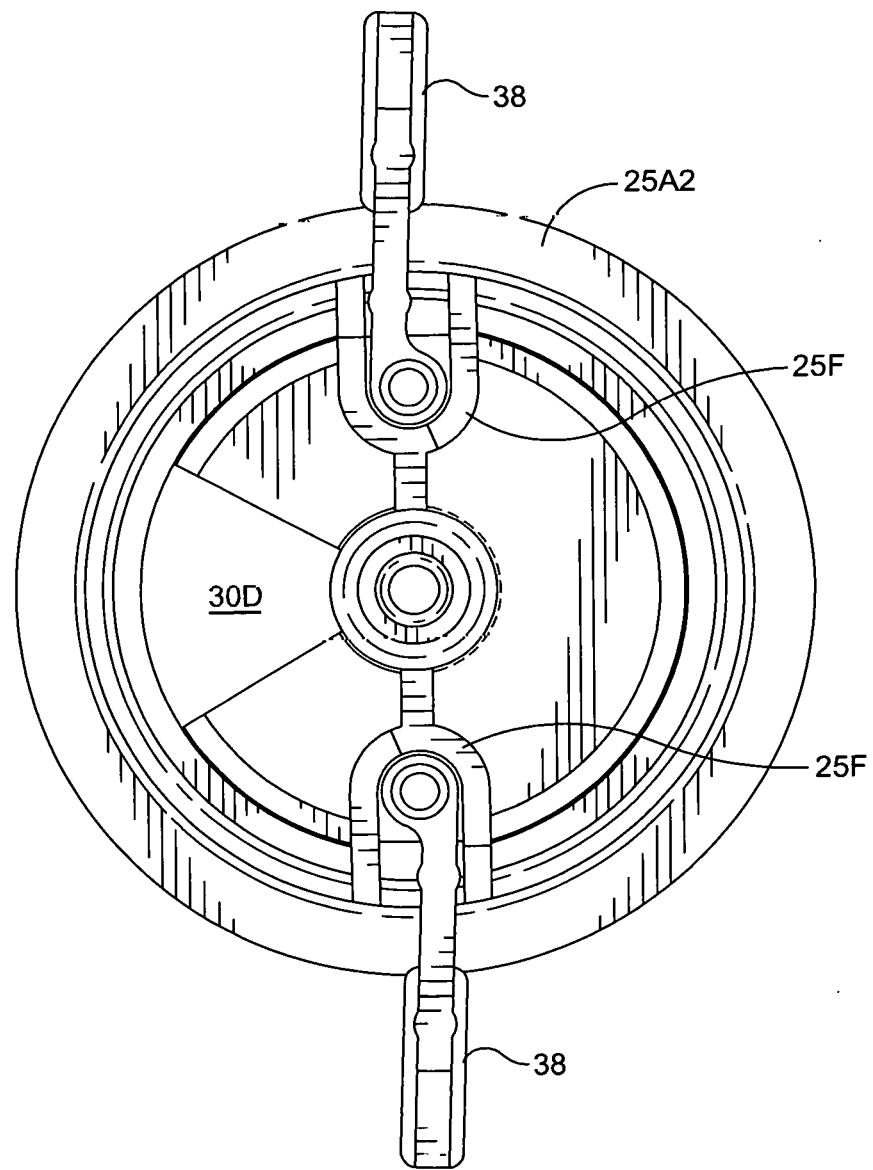
FIG. 4 top rear view of the rapid mount wall anchoring system of FIG. 1.
Figure 5:
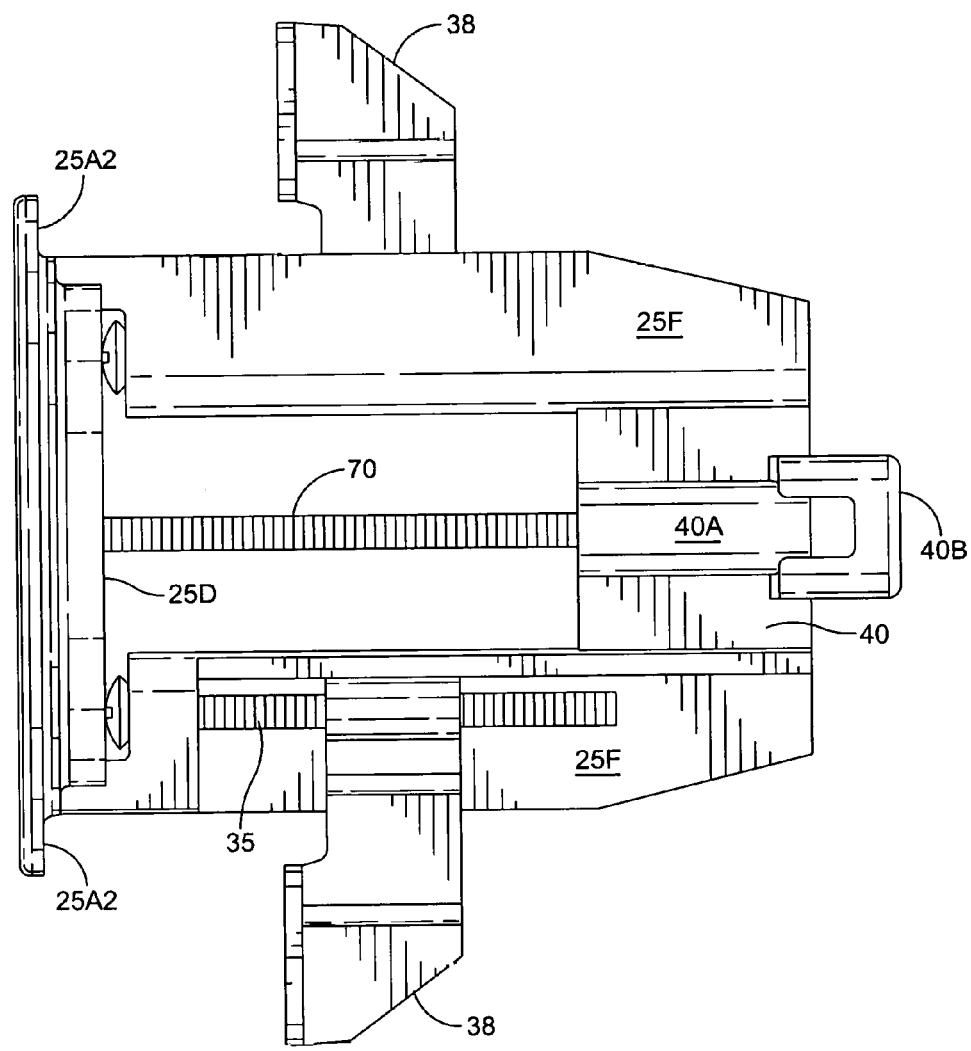
FIG. 5 is a left side view of the rapid mount wall anchoring system of FIG. 1.
Figure 6:
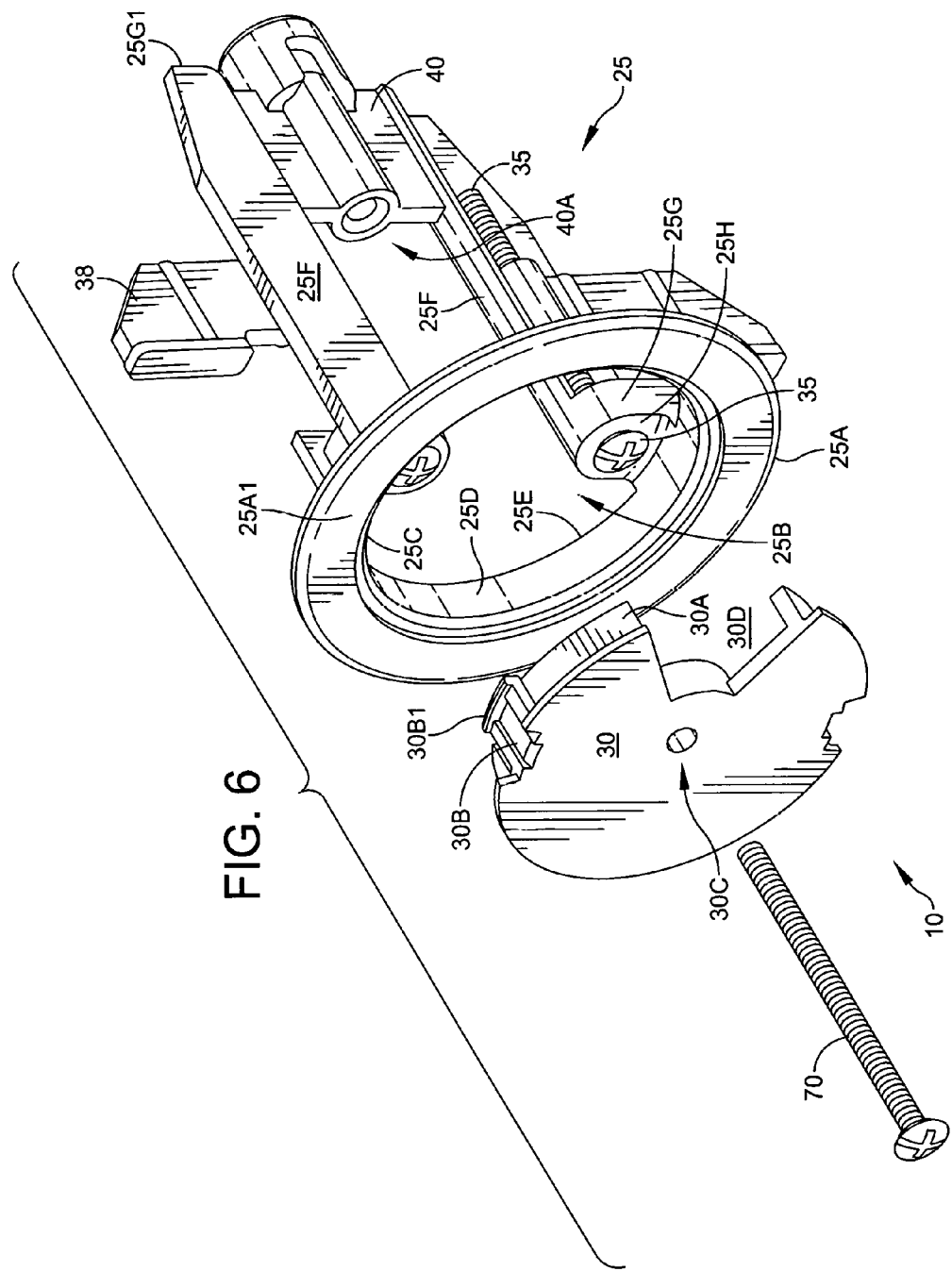
FIG. 6 is an exploded perspective view of the rapid mount wall anchoring system of FIG. 1, showing the mounting plate and fastening screw separated from the rigid frame.

In Referring to FIG. 6 there is shown a preferred embodiment of the present invention, a rapid mount wall anchoring system 10 with a rigid frame 25 and a load bearing plate insert 30. The rigid frame 25 includes a lip 25A having an opening 25B therein and an inner periphery 25C on the lip 25A surrounding the opening. Extending rearward from inner periphery 25C is a sidewall 25D extending to an outer periphery 25E. As illustrated in FIG. 4 and FIG. 6, two guide members 25F aligned opposite each other, and integral with the frame 25, extend rearward from outer periphery 25E. The two guide members 25F include mounting bosses 25G include a face 25H including apertures therein (not shown). The lip 25A includes a front surface 25A1 and the faces 25H of the mounting bosses 25G are recessed away from the front surface 25A1 of the Lip 25A. Although two guide members 25F are illustrated, a single guide member 25F having a threaded bore 40A arrangement in alignment with threaded bore 30C could be utilized with reduced load bearing characteristics. Further, the guide member and mounting arrangement may be a single element or arranged separately without departing from the spirit and scope of the invention.

Figure 1:
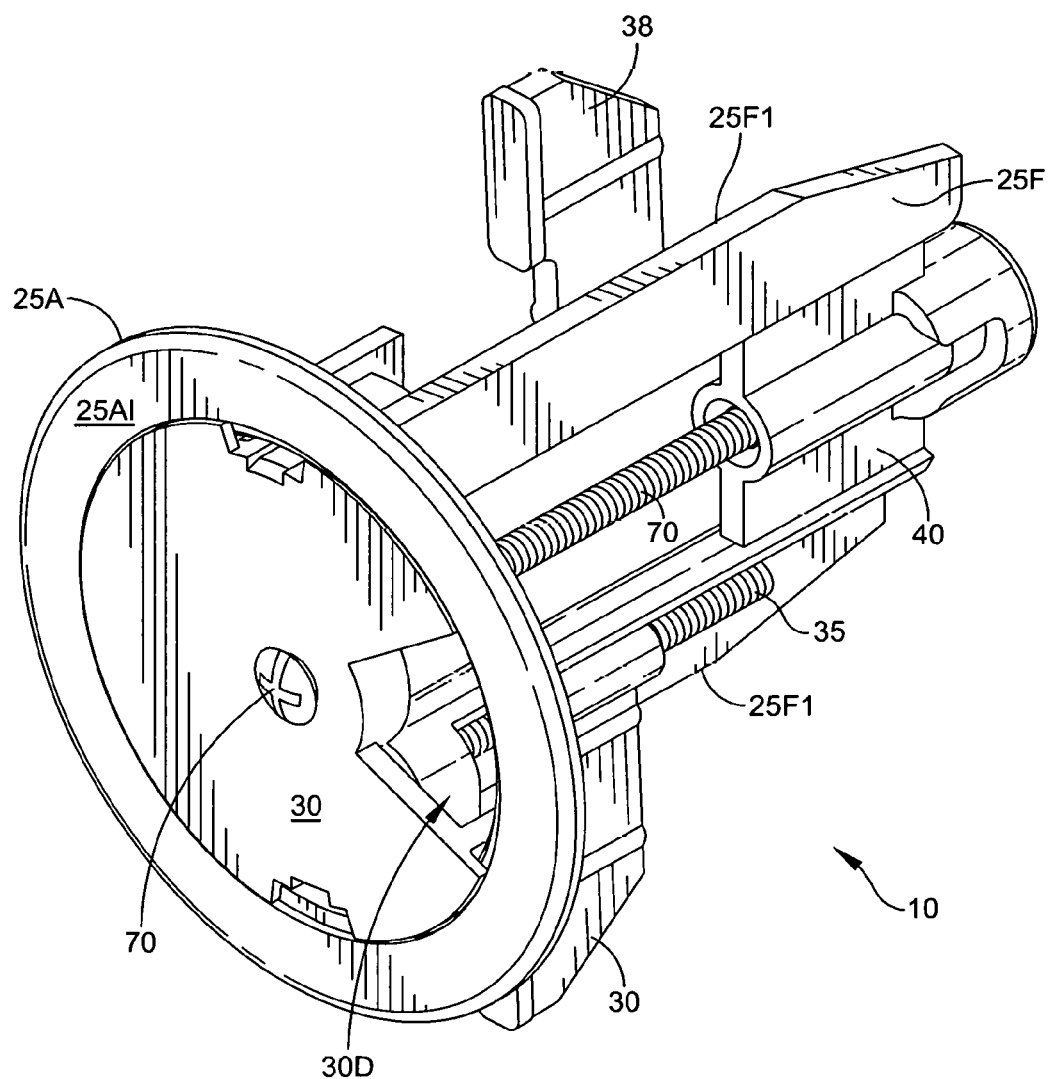
FIG. 1 is a front perspective view of the rapid mount wall anchoring system employing the principles of the present invention.
Figure 2:
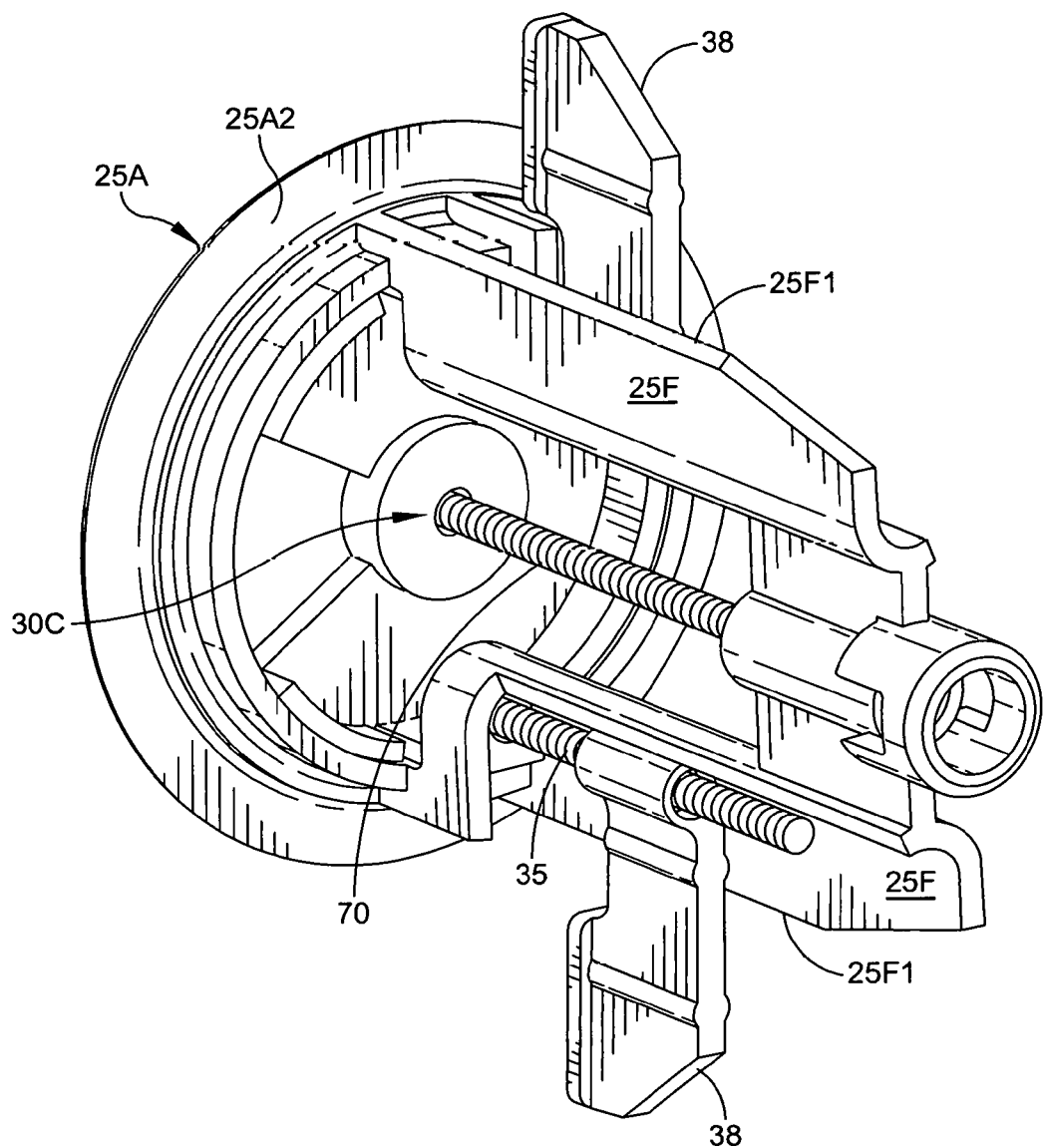
FIG. 2 is a rear perspective view of the rapid mount wall anchoring system of FIG. 1.
Figure 3:
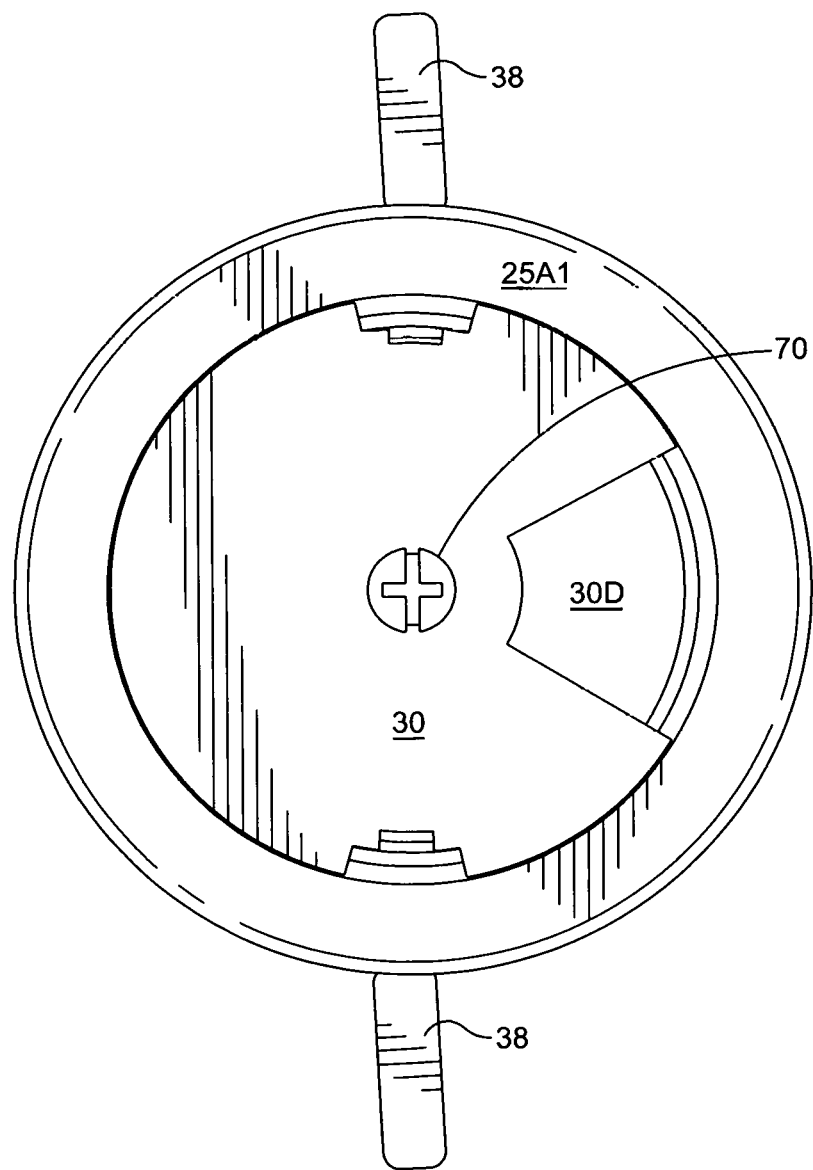
FIG. 3 is a top front view of the rapid mount wall anchoring system of FIG. 1.
Figure 7:
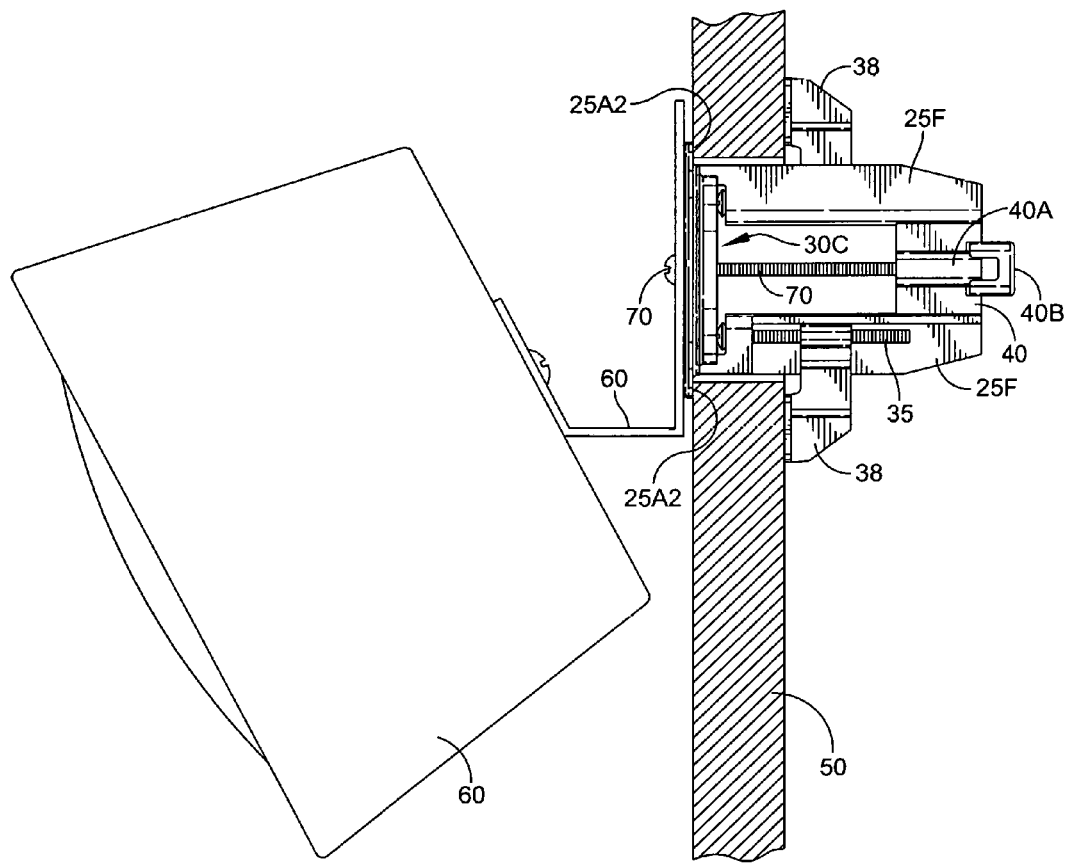
FIG. 7 illustrates the rapid mount wall anchoring system of FIG. 1, installed within a wall and supporting an attached device thereon.

Substantially long threaded fasteners 35 extend through mounting bosses 25G apertures and engage clamp arms 38. Clamp arms 38 include a threaded bore for engagement of threaded fasteners 35 to rotate clamp arms 38 between an extended position and retracted position as desired. The clamp arms 38 may also be rotated inward so they are confined within the perimeter of lip 25A. Referring to FIGS. 2 and 7, the wall anchoring system 10 can then be inserted into a circular hole in a wall, the hole having a diameter less than the diameter of lip 25A and preferably a diameter equal to the distance between guide member edges 25F1. This will allow for lip 25A rear surface 25A2 to engage the wall surface as illustrated in FIG. 7. The clamp arms 38 are then rotated outward and each threaded fastener 35 can be easily rotated within its aperture as desired by turning the head of the respective fastener 35 with an appropriate tool such as a screwdriver (not shown), causing the clamp arms 38 to pull rear surface 25A2 against wall 50.

In the preferred embodiment guide members 25F are situated 180 degrees apart having at one end mounting bosses 25G and opposite ends 25G1 connected via cross member 40. Cross member 40 includes a threaded bore 40A and wire hang 40B. Referring to FIG. 2 and FIG. 6, Load bearing plate insert 30 includes a circular sidewall 30A and a threaded bore 30C positioned in alignment with threaded bore 40A. Threaded bores 30C and 40A accept threaded mounting fastener 70 for securement of devices to plate insert 30. Plate Insert 30 further includes connection means for securing plate insert 30 into opening 25B. In the preferred embodiment, the connection means are resiliently flexible tabs 30B having a lip 30B1 that engages outer periphery 25E locking plate insert 30 in place. When locked in place plate insert 30 circular sidewall 30A slideably engages sidewall 25D, allowing for plate 30 to be rotated to a limited degree up until lip 30B1 contacts mounting bosses 25G.

Plate insert 30 further includes an opening 30D for the passage of cables from an interior wall to a mounted device. As illustrated in FIG. 7, wall anchoring system 10 is shown installed within wall 50 for support and hanging of device 60. In the example, a brace 65 is screwed to anchoring system 10 by threaded mounting fastener 70 and the brace supports device 60. As illustrated in FIG. 7, threaded mounting fastener 70 engages plate 30 through threaded bore 30C and Cross member 40 threaded bore 40A to support the load of device 60.

Although a separate brace 65 is illustrated any device mounting arrangement may be utilized for engagement with fastener 70, including direct mounting to fastener 70. The combination of clamp arms 38, load bearing plate 30, and cross member 40 allow for the hanging of devices of significant weight. The wall anchoring system 10 has been shown to support weights of at least 90 lbs for plates 30 being less than 2 inches in diameter. For ceiling installations cross member 40 includes a wirehang 40B that may be connected to a wire (not shown) secured on one end to an interior roof stud. The wall anchoring system 10 may be molded of various plastics including polycarbonate, polyvinyl chloride, acrylonitrilebutadience styrene, and polyethylene, as well as others known in the art for the intended application of supporting a load.

It should be understood that the foregoing description is only illustrative of the invention. Thus, various alternatives and modifications can be devised by those skilled in the art without departing from the invention. Accordingly, the present invention is intended to embrace all such alternatives, modifications and variances that fall within the scope of the appended claims.

I claim:

1. A wall anchoring system for securing objects to a wall, further comprising:
   a rigid frame, comprising:
      at one end a lip extension, said lip extension having a closed perimeter defining a central opening, said lip extension having a front and rear surface, said lip extension further including a sidewall, said sidewall having a first end and a second end, the first end connected to the rear surface, the sidewall extending away from said rear surface to said second end, said second end of said sidewall defining a peripheral edge;
      first and second opposing guide members each having a middle section extending between proximal and distal ends, said proximal ends of said first and second opposing guide members secured at said peripheral edge of said sidewall, said middle sections of said first and second opposing guide members extending away from said peripheral edge to said distal ends of said first and second opposing guide members, said distal ends of said first and second opposing guide members including a cross-member therebetween, said cross-member including a first threaded bore, said first threaded bore in substantial alignment with said central opening;

a fastener for securing said object to said frame, said fastener having a middle section extending between a first and second end, said fastener middle section positioned between said middle sections of said first and second opposing guide members, said fastener second end engaging said first threaded bore for securing said object to said frame;

a plate insert positioned within said central opening, said plate insert including a second threaded bore therein, said first and second threaded bores in substantial alignment with said central opening, said fastener first end engaging said second threaded bore of said plate insert; and a mounting arrangement for securing said rigid frame to the wall.

2. A wall anchoring system for securing objects to a wall as in claim 1 wherein said plate insert includes an opening for cable pass through.

3. A wall anchoring system for securing objects to a wall as in claim 1 wherein said plate insert includes means for securing said plate insert within said central opening.

4. A wall anchoring system for securing objects to a wall, comprising:
   a rigid frame, comprising:
      at one end a lip extension, said lip extension having a closed perimeter defining a central opening, said lip extension having a front and rear surface, said lip extension further including a sidewall, said sidewall having a first end and a second end, the first end connected to the rear surface, the sidewall extending away from said rear surface to said second end, said second end of said sidewall defining a peripheral edge;

first and second opposing guide members each having a middle section extending between proximal and distal ends, said proximal ends of said first and second opposing guide members secured at said peripheral edge of said sidewall, said middle sections of said first and second opposing guide members extending away from said peripheral edge to said distal ends of said first and second opposing guide members, said distal ends of said first and second opposing guide members including a cross-member therebetween, said cross-member including a first threaded bore, said first threaded bore in substantial alignment with said central opening;

a fastener for securing said object to said frame, said fastener having a middle section extending between a first and second end, said fastener middle section positioned between said middle sections of said first and second opposing guide members, said fastener second end engaging said first threaded bore for securing said object to said frame;

a mounting arrangement for securing said rigid frame to the wall, the mounting arrangement comprising a mounting boss at each of the proximal ends of said first and second opposing guide members and respectively integral therewith, said mounting bosses positioned rearward from said lip extension front surface; and an aperture in each of said mounting bosses.

5. A wall anchoring system for securing objects to a wall as in claim 4 wherein said mounting arrangement further includes:
   a mounting fastener extending through each of said apertures in said mounting bosses respectively; and
   a clamp arm in engagement with each of said mounting fasteners respectively.

6. A wall anchoring system for securing objects to a wall as in claim 4 wherein said first and second opposing guide members are 180 degrees apart.

* * * * *